Sept. 19, 1939.          A. W. OELGOETZ                2,173,311
              MEANS FOR DISPENSING POWDERED MILK COMPOUNDS
                   Filed March 30, 1938          2 Sheets-Sheet 1
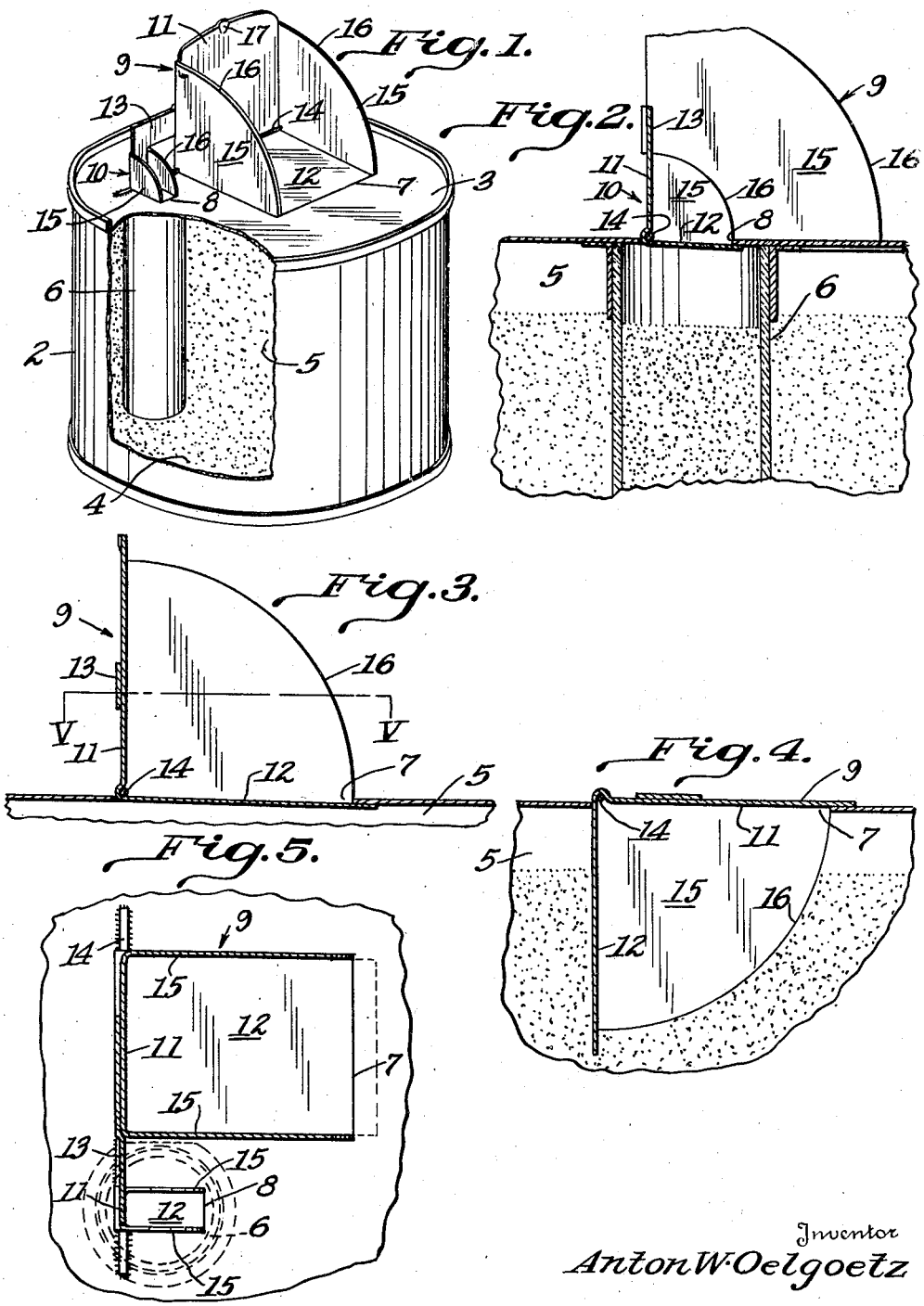
Inventor
Anton W. Oelgoetz

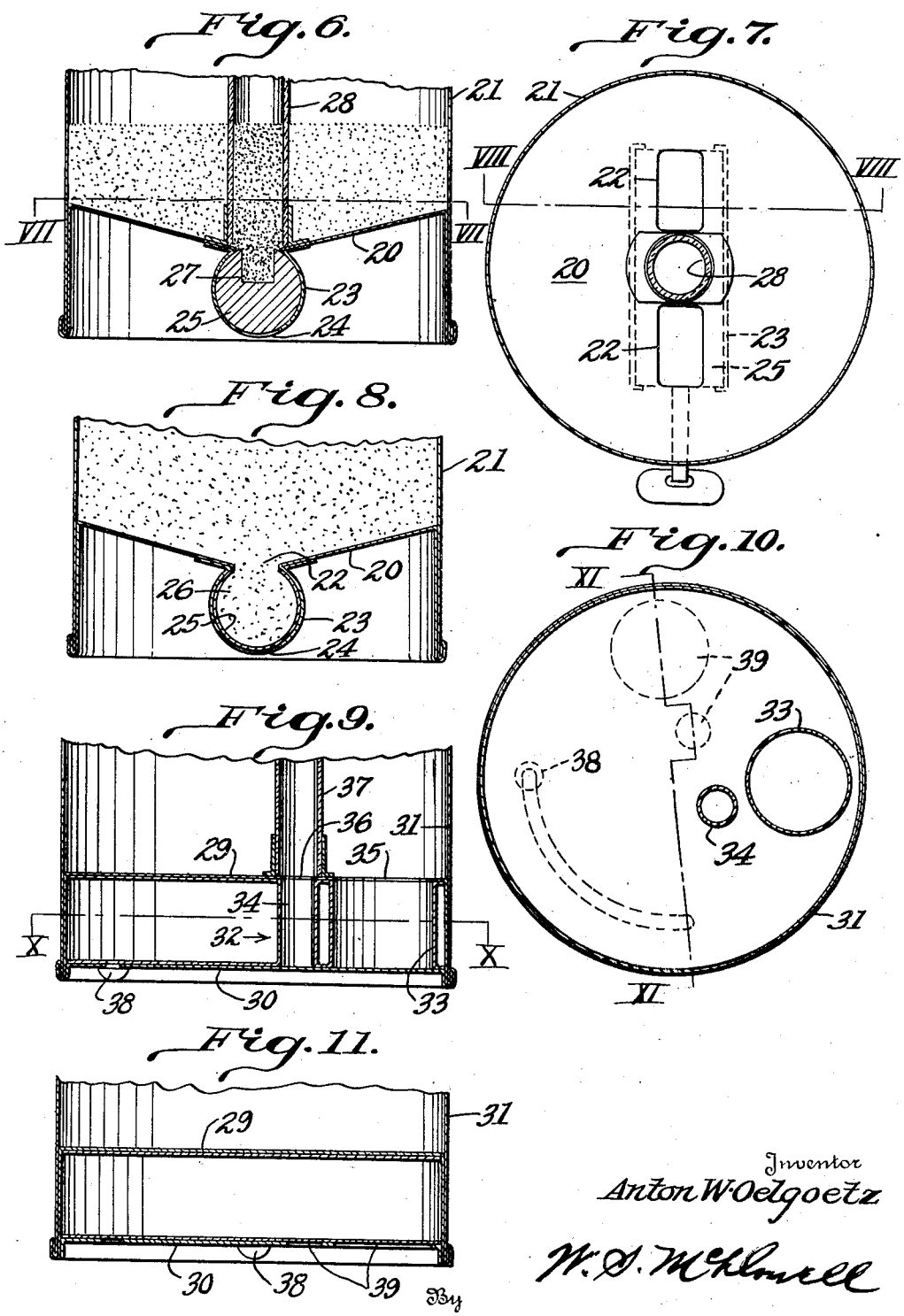

Patented Sept. 19, 1939

2,173,311

UNITED STATES PATENT OFFICE 2,173,311

MEANS FOR DISPENSING POWDERED MILK COMPOUNDS

Anton W. Oelgoetz, Columbus, Ohio

Application March 30, 1938, Serial No. 198,934

5 Claims. (Cl. 221—96)

This invention relates to an improved means for dispensing powdered milk and compounds containing powdered milk, the general object of the invention being to provide an improved means for dispensing such milk wherein the desiccated product is maintained in a cleanly and sterile condition while it is disposed within a closed container and when being dispensed in measured portions from the container, and wherein provision is further made to effect the discharge of measured quantities of the preparation from the container without requiring the removal of lids, covers or other closures for the container.

It is known that fresh liquid milk is often an excellent medium for the growth of bacteria. It provides food, liquid and, if warmed, all the conditions necessary for favorable bacterial growth. Likewise, such fresh milk is composed of substantially 90% water. A much more practical form in which to market milk is to desiccate or powder the same. This eliminates shipping water, provides a powdered food concentrate, and offers a medium of packing which is not so apt to permit of bacterial infection.

Many milk powders are now available on the market. However, in order to be used, these products require the removal of lids or other container covers, thus exposing the contents to dust, bacteria and the like. Usually these containers are provided with a small metallic measuring implement so that the powder may be dispensed in approximately correct quantities. The act of opening the container and measuring a quantity of the powdered preparation for making the liquid mixture, renders the entire contents of the can exposed to infection.

Among other features, the present invention provides an improved dispensing container for receiving and discharging milk powder or other similar comminuted substances, the dispenser being provided with a measuring valve so formed and disposed as to effect the discharge from the interior of the container of a definite quantity of the powdered substance, and accomplishing this without requiring the opening of the container or the touching of the powder with the hands of the operator, the dispenser making it possible to remove a fixed quantity of milk powder in a neat orderly manner and with sterile technique.

Another aspect of the present invention has to do with the simultaneous dispensing from a single closed container of powdered milk and powdered enzymes from separate chambers of the container. Milk is known to contain all of the food components necessary for growth. However, whole milk, as such, does not contain any food value. It has been demonstrated that to give rise to food value, milk must be digested by coming into contact with the pancreatic enzymes (digestive enzymes) which split or hydrolyze the whole milk proteins and fats to fatty acids and amino acids, in which form the milk is used as food by the human system. In short, milk does not contain food as an immediate available value. The food value arises as a result of the equation:

Milk plus enzymes (lipase, proteose and amylose) equals sugar, fatty acids and amino acids.

When regular fresh milk is mixed with the digestive enzymes, it coagulates in one large mass or curd. In order to make this milk more easily digested, it has been proposed to pass the milk over a chemical compound which removes a considerable percentage of its calcium content. When milk is so processed, the resultant curd which forms on contact with digestive enzymes in the stomach is flocculent, coagulating in many small masses which offers more surface to the action of the digestive enzymes. Milk in which the normal calcium content is reduced is thus more quickly digested than regular untreated milk with normal calcium content. However, irrespective of whether the milk coagulates in one mass or in a flocculent curd, it cannot be digested at all unless it comes in contact with the proper concentration of digestive enzymes. It has been demonstrated that the reason why many people cannot digest milk, and why it will not result in a gain in weight on the part of those taking it or why it causes allergy in others, is because such people have a reduced concentration of pancreatic enzymes. In short, the pancreas suffers from hypo-function and thus fails to secrete a normal concentration of digestive enzymes.

Because milk cannot be digested without enzymic action, and does not contain any food value until after it has been acted upon by the pancreatic enzymes, it is an important part of the present invention to provide for the manufacture of powdered milk, or compounds thereof, adapted for dispensing in closed containers and wherein provision is made for dispensing from such containers digestive enzymes in powdered form, the said enzymes being normally maintained out of contact with the powdered milk while in storage within the containers and brought into contact therewith following dispensing of the powders from the containers.

When digestive enzymes are mixed with powdered milk, the enzymes immediately become active even in the powdered form, thereby imparting a bitter acrid taste to the milk due to the formation of split products of digestion. The purpose of this invention is the provision of means for marketing enzymes and powdered milk in a single container whereby the enzymes are prevented from coming in contact and thus interacting with the milk while in the container, but, upon discharge from the holding container, are automatically mixed in definite quantities which bear a quantitative relationship to each other.

Another object of the invention resides in a container for dispensing powdered milk and powdered enzymes wherein the interior of the container is formed with spaced chambers of different proportions, the larger of said chambers receiving the powdered milk, or desiccated compounds containing powdered milk, and the smaller of said chambers receiving pancreatic enzymes in admixed form with a powdered carrier, there being a sufficient quantity of enzymes contained in the smaller chamber to adequately react with or digest the entire quantity of milk contained in the larger of said chambers.

Another object of the invention resides in the provision of a compound measuring valve mechanism for controlling the simultaneous and proportionate discharge of the milk and enzymic powders from the dual chambers of the normally closed container, whereby upon the operation of the valve mechanism, proportionate and measured quantities of the two powders will be simultaneously discharged from the container in an amount quantitatively calculated to provide a single dose or quantity of the milk powder containing a sufficient amount of enzymes for its own digestion.

A still further object of the invention resides in the provision of a container for the combined dispensing of milk and enzymic powders having the measuring valve or discharge mechanism described, and wherein the construction of the container is such that it may be conveniently and economically produced so that when the container is discharged of its contents, the same may be discarded without any substantial economic loss.

For a further understanding of the invention, reference is to be had to the following description and the accompanying drawings, wherein:

Fig. 1 is a perspective view of a closed container for simultaneously receiving and dispensing powdered milk and enzymes in accordance with the features of the present invention;

Fig. 2 is a vertical sectional view taken through the cell or cylinder of the container in which the enzymic powder is stored, and disclosing the valve mechanism for effecting measured discharge of the enzymic powder from the cell or cylinder;

Fig. 3 is a similar view disclosing in an open position the measuring valve employed in governing the discharge of a milk powder from the container;

Fig. 4 is a similar view with the measuring valve for regulating the discharge of powdered milk from the container in its normal or closed position;

Fig. 5 is a horizontal sectional view taken on the plane indicated by the line V—V of Fig. 3 and disclosing the joined relationship of the dual valves employed for effecting the measured and proportioned discharge of the enzymic and milk powders from the container;

Fig. 6 is a vertical sectional view taken through the lower portion of a container of modified construction and adapted for the purposes of the present invention;

Fig. 7 is a horizontal sectional view on the plane indicated by the line VII—VII of Fig. 6;

Fig. 8 is a vertical section on the line VIII—VIII of Fig. 7;

Fig. 9 is a vertical sectional view through a still further modified form of container having the features of the present invention;

Fig. 10 is a horizontal sectional view on the line X—X of Fig. 9;

Fig. 11 is a vertical sectional view on the line XI—XI of Fig. 10.

A preferred form of container for carrying out the present invention has been disclosed in Figs. 1 to 5 inclusive, wherein the container comprises a metal casing formed to include a cylindrical side wall 2, a top wall 3 and a bottom wall 4, the walls 3 and 4 having their marginal portions clinched in flanged or beaded engagement with the upper and lower portions of the wall 2 in order to produce a normally closed container structure.

The interior of the container is formed with an enlarged chamber 5 adapted for the reception of powdered milk or other food compounds containing powdered milk, which chamber is usually filled to capacity with the powdered milk before the final closing of the container. Also arranged within the interior of the casing of the container is a cylinder 6, of comparatively small cross sectional area as regards that of the container as a whole. The cylinder 6 extends from the top to the bottom of the container and is adapted to receive pancreatic enzymes in a dry powdered state. The enzymes, because of the small comparative quantity thereof necessary for digesting the powdered milk, may be mixed or diluted with an inert carrier substance such as powdered sugar.

In order to effect simultaneously a measured and proportioned discharge of the powdered compounds from their respective chambers within the container, the top wall 3 is provided with an enlarged rectangular opening 7, which constitutes an outlet for the milk powder, and a small rectangular opening 8, forming an outlet for the enzymic powder contained within the cylinder 6. The outlet 7 is normally closed, as shown in Fig. 4, by a pivotally movable measuring valve, spout or chute 9, while the outlet 8 of the cylinder 6 is formed with a smaller but correspondingly constructed measuring valve, spout or chute 10. Preferably these valves, spouts or chutes are of sheet metal construction and include perpendicularly extending wings 11 and 12. When the outlets 7 and 8 are closed, the wings 11 occupy horizontal positions obstructing the same. When said valves, spouts or chutes are moved to assume their material discharging positions, the wings 12 thereof close the openings 7 and 8 so that with the container in an inverted position, provision for gravitational discharge of measured quantities of the powdered contents is provided. The powder contents remaining within the container are thereby confined against outflow through the discharge openings.

The wings 11 are united by means of a connecting web 13, and both of the spouts are pivotally supported on a common hinge pintle 14 which has its ends suitably secured to the top wall 3. Moreover, both of the spouts include spaced side walls 15 having curved outer edges

16. The outer edge of the winge 11 of the spout 9 is slightly recessed as at 17 so that the finger nail of the operator may be engaged therewith and sufficient pressure applied to rock both of the spouts about thier common pivotal axis from closed to open positions.

In the use of the container, when it is desired to effect a measured discharge of the contents thereof, the container is preferably inverted in order to fill the spouts or chutes with the powdered compounds disposed in the spaced internal chambers thereof. Subsequently, the container is moved to a substantially horizontal position with the walls 3 and 4 disposed in a substantially vertical plane. The chutes or spouts are then opened and their contents discharged into a suitable receptacle, the amount of material so discharged being sufficient to form a single measured feeding, with the enzymes correctly proportioned to the quantity of the milk powder to provide for its complete digestion.

It will be observed that this construction eliminates the objectionable conditions encountered in the measured removal of milk powder from the ordinary removable top container. In the first place, it eliminates the use of the hand operated measuring spoon or other vessel, enables the contents of the container to be sealed at all times from the entrance of extraneous foreign matter and furthermore enables the materials to be measured and discharged quickly and positively in measured and quantitatively related amounts and without waste. The construction enables enzymes to be dispensed in the same container with powdered milk and permits this to be done in the home by persons unskilled in the medical or nursing professions. In hospitals, the container provides for a considerable saving of time in the preparation of infants' feedings and provides for improved conditions of sanitation impossible with prior methods and container constructions.

The container is, of course, subject to considerable variation in obtaining the results desired. For instance, as shown in Figs. 6 to 8, a false bottom 20 is provided in the lower portion of the container 21, which bottom slopes toward a pair of spaced outlets 22. Below the outlets 22, the bottom 20 is provided with a horizontally extending barrel 23 having openings 24 in the bottom thereof which are disposed in vertical registration with the outlets 22. Rotatably mounted in the barrel 23 is a sleeve valve 25, which includes measuring pockets 26 normally disposed in registration with the outlets 22. Between the pockets 26, the sleeve valve is provided with a smaller pocket 27, which is arranged in registration with the lower open end of an enzyme-receiving tube 28, disposed axially and stationarily within the container 21. By this construction, it will be seen that in order to effect a measured discharge of the contents of the container, it is merely necessary to rotate the sleeve valve through approximately 180° of movement. The pockets 26 and 27 are of such size as to receive the desired amounts of the powdered milk and enzymes, thus performing the same functions as the oscillating valves or spouts of the previously described form of the invention.

In Figs. 9 and 10 another mechanical variation of the container comprising the present invention is disclosed. This container includes spaced upper and lower bottom walls 29 and 30 respectively. Rotatably mounted between these walls and the outer cylindrical wall 31 of the container is a discharge valve 32. This valve carries a vertical tube 33 of comparatively large diameter and a spaced parallel tube 34 of considerably smaller cross sectional diameter. The upper ends of these tubes register with openings 35 and 36 formed in the wall 29, which openings possess approximately the same diameter as the internal diameters of the tubes with which they register. Milk powder from the interior of the container normally gravitates into the tube 33, and the enzymic powder from the stationary cylinder 37 gravitates into the opening 34. When it is desired to discharge the contents of the tubes 33 and 34, the valve 32 is rotated by means of finger pressure applied to a stud 38 which projects from the bottom of the valve and operates in an arcuate slot formed in the wall 30. The rotating movement of the valve is continued from its normal receiving position to its final discharge position, limited by the length of the slot in which the stud 38 operates. When this limit of movement is reached, the lower ends of the tubes 33 and 34 will register with correspondingly formed openings 39 formed in the wall 30, thus allowing the contents of the tubes 33 and 34 to be discharged into an adjacent vessel. During rotary movement of the valve 32 from its normal filling position, the openings 35 and 36 will be closed by the top wall of the valve and, likewise, the openings 39 in the container wall 30 are normally closed by the bottom wall of the valve.

From the foregoing, it will be seen that the present invention provides a container which maintains the enzymes entirely separate from the milk powders while the latter are packed within the container, but automatically dispenses and mixes the required proportions of milk powders and enzymes for each feeding, the quantity of enzymes delivered being such as to provide for the complete digestion of the milk powder dispensed therewith. If the milk powder is desired to be used without the enzymes, the dispensing valves need not be connected for joint operation but may be actuated selectively. The containers may be made of aluminum, tin or waxed paper, or any other material sufficiently economical so that the dispenser can be thrown away when empty.

The present invention provides an orderly, cleanly and efficient container which will dispense a fixed, accurate and convenient quantity of milk powder. Another aspect of the invention provides a container having the combined dispensers, bearing a definite size relationship to each other, so that the quantity of material delivered by the smaller of the dispensers has a definite quantitative relationship to the quantity delivered by the larger. This dual dispenser can be used for the delivery of any pulverulent compounds in which the two compounds cannot be pre-mixed. The two powdered compounds are maintained within the container in spaced relationship from each other so that they cannot interact while within the container. After the desired quantities are delivered to a mixing vessel and admixed with water or milk, the mixture is of course taken at once, before the enzymes have had time to act upon the milk. When so taken, they cannot be tasted or their presence detected.

What is claimed is:

1. A container for packing and dispensing powdered milk and related compounds comprising an outer casing formed with an internal chamber for receiving powdered milk, an inner casing mounted within said outer casing, said inner casing being adapted for the reception of a powdered enzymic compound, spaced outlets communicating with the powdered milk chamber and with the interior of said inner casing, measuring dispensers normally closing said outlets, and means for effecting movement of said dispensers in unison.

2. A container for packing and dispensing powdered milk and related compounds comprising an outer casing having side and end walls, an inner casing disposed within the confines of said outer casing and stationarily positioned between said end walls, and pivoted measuring dispensers carried by one of said end walls to open and close outlets leading from said inner and outer casings, said dispensers being joined for swinging movement in unison.

3. In a container, a casing for the reception of a quantity of a powdered substance, a second casing carried by said first casing and having an outlet communicating with the exterior, said second casing being formed for the reception of a different comminuted substance, the quantity of the substance in said second casing being in predetermined proportion to the contents of the first casing, and means for simultaneously dispensing measured quantities of the contents of the casings in the same proportions as contained in the casings.

4. In a container, a casing for the reception of a quantity of a powdered substance, a second casing disposed within said first casing, said casings having separate outlets, measuring dispensers carried in connection with said container, said dispensers being movable from positions in registration with said casing outlets to discharge positions, and means connecting said dispensers for movement in unison.

5. In a container, a casing formed for the reception of a comminuted substance, a second casing of reduced size disposed within said first casing and adapted to receive a different comminuted substance, the relative sizes of the casings being predetermined, said casings having separate outlets, a measuring dispenser in registration with each of said outlets, the relative proportions of said dispensers being similar to that of said casings, said dispensers being movable about a horizontal axis between receiving and discharging positions, and means for connecting said dispensers for movement in unison.

ANTON W. OELGOETZ.